US007434569B2

(12) United States Patent
Wang

(10) Patent No.: US 7,434,569 B2
(45) Date of Patent: Oct. 14, 2008

(54) FUEL ECONOMIZER

(76) Inventor: Jin-Lang Wang, No.179, Jhangshuei Rd., Changhua City, Changhua County 500 (TW)

(*) Notice: Subject to any disclaimer, the term of this patent is extended or adjusted under 35 U.S.C. 154(b) by 34 days.

(21) Appl. No.: 11/586,666

(22) Filed: Oct. 26, 2006

(65) Prior Publication Data

US 2007/0256672 A1 Nov. 8, 2007

(30) Foreign Application Priority Data

May 4, 2006 (TW) .............................. 95115874 A
Aug. 10, 2006 (TW) .............................. 95129360 A

(51) Int. Cl.
*B01D 35/06* (2006.01)

(52) U.S. Cl. ...................................................... 123/538

(58) Field of Classification Search ......... 123/536–538; 210/222, 695
See application file for complete search history.

(56) References Cited

U.S. PATENT DOCUMENTS

| | | | | |
|---|---|---|---|---|
| 3,349,354 | A * | 10/1967 | Miyata | 335/209 |
| 5,055,188 | A * | 10/1991 | Johnston et al. | 210/222 |
| 5,307,779 | A * | 5/1994 | Wood et al. | 123/538 |
| 5,487,370 | A * | 1/1996 | Miyazaki | 123/538 |
| 5,533,490 | A * | 7/1996 | Pascall | 123/538 |
| 6,041,763 | A * | 3/2000 | Akyildiz | 123/538 |
| 6,361,689 | B1 * | 3/2002 | Munzing | 210/222 |
| 2001/0032629 | A1 * | 10/2001 | Nozato | 123/538 |
| 2003/0010326 | A1 * | 1/2003 | Arkfeld | 123/538 |

* cited by examiner

*Primary Examiner*—M. McMahon
(74) *Attorney, Agent, or Firm*—Alan Kamrath; Kamrath & Associates PA

(57) ABSTRACT

A fuel economizer comprises a pipeline with thermal conducting elements and having a chamber contained therein, a plurality of magnetic elements each of which having a through hole formed therein and wrapped within a metal element that is formed with a plurality of spacings and disposed within the chamber of the pipeline, and a plurality of elastic elements disposed within the chamber of the pipeline and located at two opposite sides of the magnetic elements, respectively.

20 Claims, 6 Drawing Sheets

FUEL ECONOMIZER

BACKGROUND OF THE INVENTION

1. Field of the Invention

The present invention relates to a fuel economizer and, more particularly to a fuel economizer that does not require electrical power and has a simple structure easy to clean and maintain and also has an affordable price.

2. Descriptions of the Related Art

Under the trend towards energy saving and environmental protection, typically a fuel saver may be mounted where the fuel has not yet entered the engine of a car so as to increase the horsepower and reduce the carbon deposit and save the fuel as well.

The conventional fuel saver has a structure that can release far-infrared ray or magnetic energy, thereby finely activating the fuel molecules transported in the fuel pipes to increase the combustion efficiency and fulfill the purpose for fuel saving.

However, the disadvantages of the conventional fuel saver lie in that the product has a rather complicated structure, which results in a high cost and difficulty in mounting and disassembling and, therefore, very expensive maintenance and clean so that it has low market acceptance. Moreover, the conventional fuel saver cannot eliminate the impurities in the transported fuel so that the engine has a largely shortened lifetime. Thus, the conventional fuel saver has still some drawbacks needed to be resolved.

SUMMARY OF THE INVENTION

It is one objective of the present invention to provide a fuel economizer, in which a plurality of thermal conductive elements provided with a pipeline of the fuel economizer absorbs a large quantity of heat from the outside of the fuel economizer to preheat the fuel flowing through the pipeline of the fuel economizer such that the temperature of the fuel can be increased beforehand to an ignition point for facilitating ignition and complete combustion in an engine, and thus reducing waste gas produced.

It is another objective of the present invention to provide a fuel economizer, in which magnetic elements disposed within a chamber of the pipeline of the fuel economizer can release magnetic energy to finely activate fuel molecules, and hence increasing combustion efficiency of the fuel so as to fulfill the purposes for fuel saving and horsepower increase, and the magnetic elements also can absorb impurities carried in the fuel to lengthen the lifetime of the engine.

A fuel economizer fulfilling the objectives described above comprises a pipeline with thermal conducting elements and having a chamber contained therein, a plurality of magnetic elements each of which having a through hole formed therein and wrapped within a metal element that is formed with a plurality of spacings and disposed within the chamber of the pipeline, and a plurality of elastic elements disposed within the chamber of the pipeline and located at two opposite sides of the magnetic elements, respectively.

Preferably, the fuel economizer further comprises two engaging parts respectively disposed at two ends of the pipeline having the thermal conducting elements.

Preferably, the engaging parts are provided with inner surface threads and outer surface threads.

Preferably, the thermal conducting elements of the pipeline are fins.

Preferably, the thermal conducting elements of the pipeline are coils.

Preferably, the magnetic elements are disposed in a way that the neighboring magnetic elements have opposite polarities within the chamber of the pipeline.

Preferably, the metal element has a plurality of protrusions integrally formed with the metal element and outwardly extending from the metal element.

Preferably, the metal element is made of copper, iron, aluminum, tin, zinc, nickel, gold, silver, lead, palladium or other composite metals.

Preferably, the elastic elements are springs.

DESCRIPTION OF THE PREFERRED EMBODIMENTS

Although the present invention will be described fully by reference to the accompanying drawings, which include preferred embodiments of the present invention, those skilled in the art may made modifications of the invention described herein while obtain the function of the present invention. Thus, it will be appreciated that the specification in the following is a general disclosure to those skilled in the art and the content thereof has no limitation to the present invention.

Figure 1:
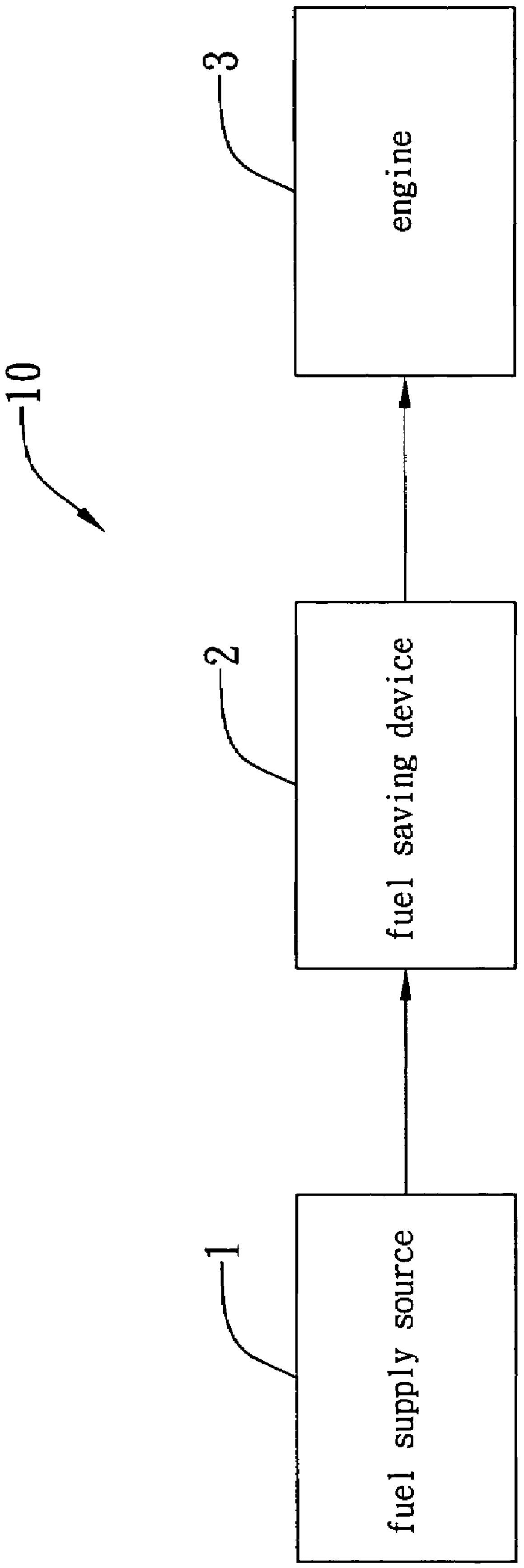
FIG. 1 shows a block diagram of a fuel system associated with the fuel economizer of the present invention.

Referring to FIG. 1, which shows a block diagram of a fuel system associated with the fuel economizer of the present invention. In this preferred embodiment, a fuel system 10 comprises at least a fuel supply source 1, an engine 3, and a fuel economizer 2 provided between the fuel supply source 1 and the engine 3. The fuel economizer 2 does not require electric power and has a simple structure in which the components can be disassembled easily for clean or maintenance, and has an affordable price to meet the market acceptance. Please also refer to FIG. 2, which shows a cross sectional view of the fuel economizer according to a first embodiment of the present invention. The fuel economizer 2 is used for transporting the fuel supplied from the fuel supply source 1 to the engine 3 for combustion. A pipeline 4 has fins 41 thereof for preheating the fuel flowing through a chamber 5 thereof so that the temperature of the fuel can be increased beforehand and the fuel having been in the engine 3 can reach easy ignition and complete combustion, and thus reducing waste gas produced. Moreover, a plurality of magnetic elements 6 disposed within the chamber 5 of the pipeline 4 can release magnetic energy to finely activate the fuel molecules and then to increase the combustion efficiency of the fuel so as to fulfill the purposes for fuel saving and horsepower increase. The magnetic elements 6 also can absorb the impurities carried in the fuel so as to lengthen the lifetime of the engine 3.

Figure 2:
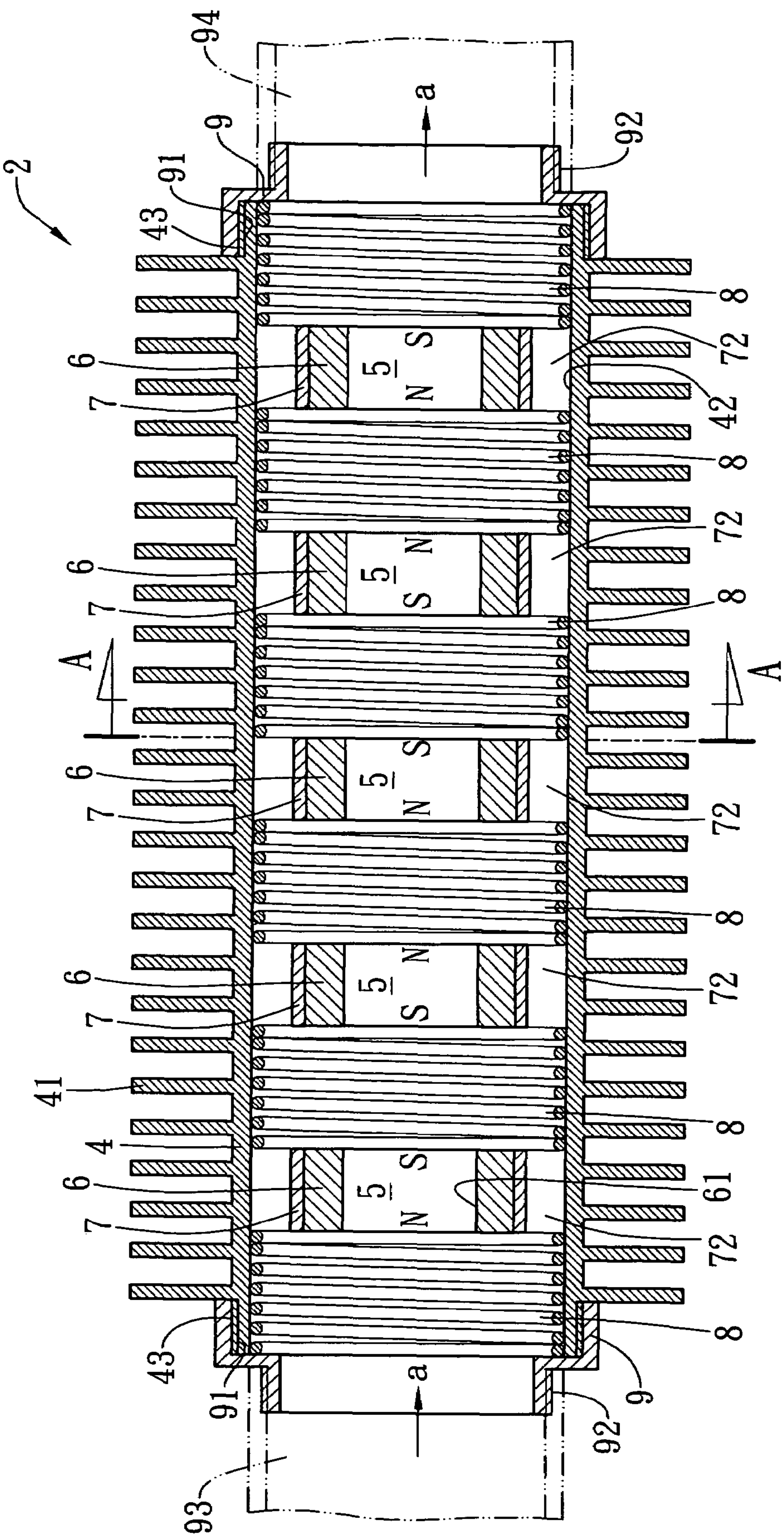
FIG. 2 shows a cross sectional view of the fuel economizer according to a first embodiment of the present invention.
Figure 3:
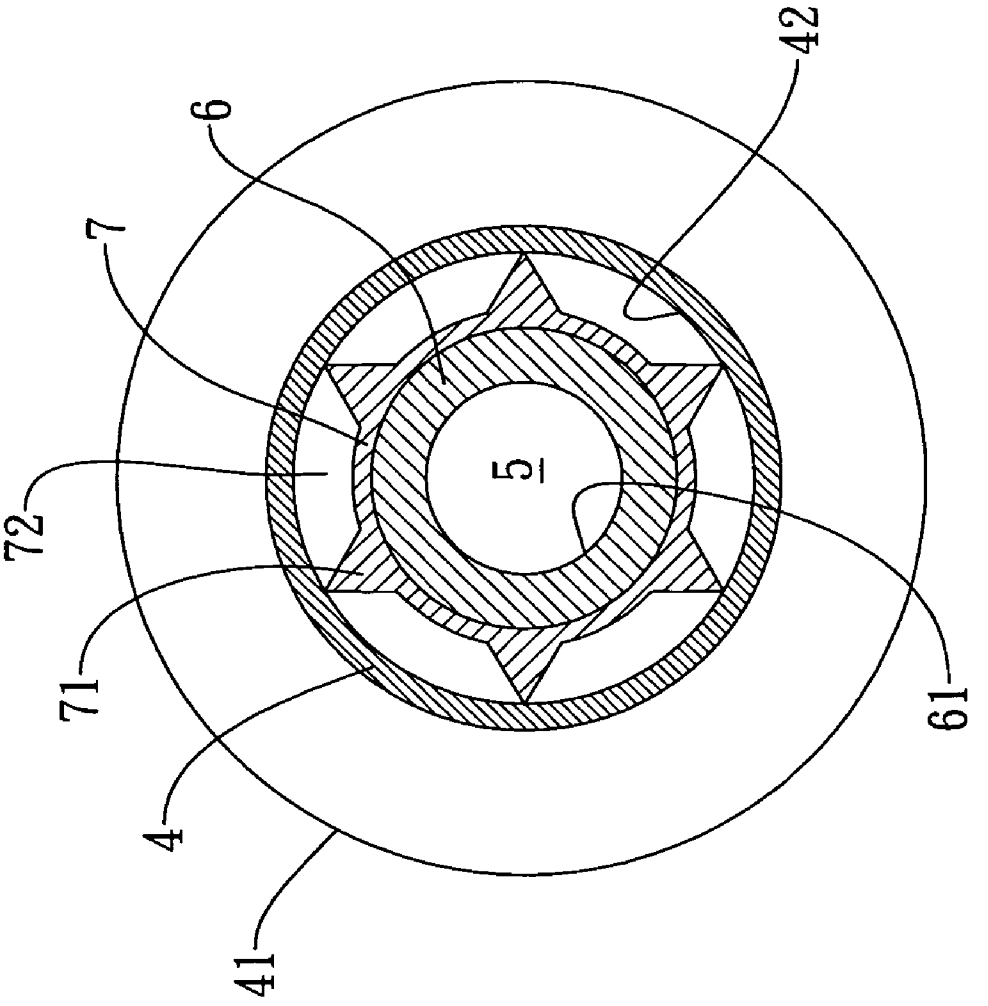
FIG. 3 shows a cross sectional view along line A-A of FIG. 2.

Continually referring to FIG. 2 in company with FIG. 3, which shows a cross sectional view along line A-A of FIG. 2. The fuel economizer 2 of the present invention comprises a pipeline 4 with thermal conducting elements and having a chamber 5 for the fuel to flow through (as shown by the arrows a in FIG. 2), a plurality of magnetic elements 6 each of which provided with a through hole 61 and wrapped within a metal element 7 that is formed with a plurality of spacings 72 and disposed within the chamber 5 of the pipeline 4, and a plurality of elastic elements 8 disposed within the chamber 5 of the pipeline 4 and located at two opposite sides of the magnetic elements 6, respectively.

In this preferred embodiment, the thermal conducting elements of the pipeline 4 are annular fins 41, wherein the fins 41 have the surface areas thereof used for absorbing a large quantity of heat from the outside of the fuel economizer 2 to preheat the fuel flowing through the pipeline 4. The magnetic elements 6 are magnets, which are arranged in a way such that neighboring magnetic elements 6 have like polarities, and like poles are adjacent each other (as shown by the N-pole and S-pole in FIG. 2). Each of the metal elements 7 has a plurality of protrusions 71 and wraps one of the magnetic elements 6, wherein the protrusions 71 are integrally formed with the metal element 7 and extend outwardly from the metal element 7 so that the plurality of protrusions 71 contacts the inner surface 42 of the pipeline 4 and thus a plurality of the spacings 72 are formed between the metal element 7 and the inner surface 42 of the pipeline 4 for the fuel to flow through. The metal element 7 also protects the magnetic element 6 from being damaged due to undue external force. The metal element 7 can be made of copper, iron, aluminum, tin, zinc, nickel, gold, silver, lead, palladium or other composite metals. The elastic elements 8 are springs, which are disposed on two opposite sides of the magnetic elements 6, respectively, and used for buffering the repulsion fore produced by the magnetic elements 6 due to being arranged in like polarities from each other. The elastic elements 8 also can absorb over-displacement and over-vibration of the magnetic elements 6 when the fuel flows through the chamber 5 so as to stabilize the magnetic elements 6. Moreover, two engagement parts 9 are disposed at two ends of the pipeline 4. Each of the two engagement parts 9 is formed with inner surface threads 91 and outer surface threads 92. The inner surface threads 91 of the engagement parts 9 are used for engaging with outer surface threads 43 of the pipeline 4. The outer surface threads 92 of the two engagement parts 9 are used for engaging with a fuel supply piping 93 and an engine piping 94, respectively.

When the fuel flows through the chamber 5 of the pipeline 4 in the direction indicated by the arrows a as shown in FIG. 2, the fuel flows smoothly over the through holes 61 of the magnetic elements 6 and the spacings 72 of the metal elements 7, wherein the magnetic elements 6 release magnetic energy to finely activate the fuel molecules to increase the combustion efficiency of the fuel so as to fulfill the purposes for fuel saving and horsepower increase. The magnetic elements 6 also can absorb the impurities carried in the fuel so as to lengthen the lifetime of the engine 3. Moreover, the fins 41 have the surface areas thereof used for absorbing a large quantity of heat from the outside of the fuel economizer 2, and conducting the heat to the inner surface 42 of the pipeline 4 so as to preheat the fuel flowing through the spacings 72. As a result, the temperature of the fuel can be increased beforehand to reach an ignition point for facilitating ignition and complete combustion, and thus reducing waste gas (carbon deposit) produced. The fuel economizer 2 of the present invention has economic benefits and environmental protection effect.

Figure 4:
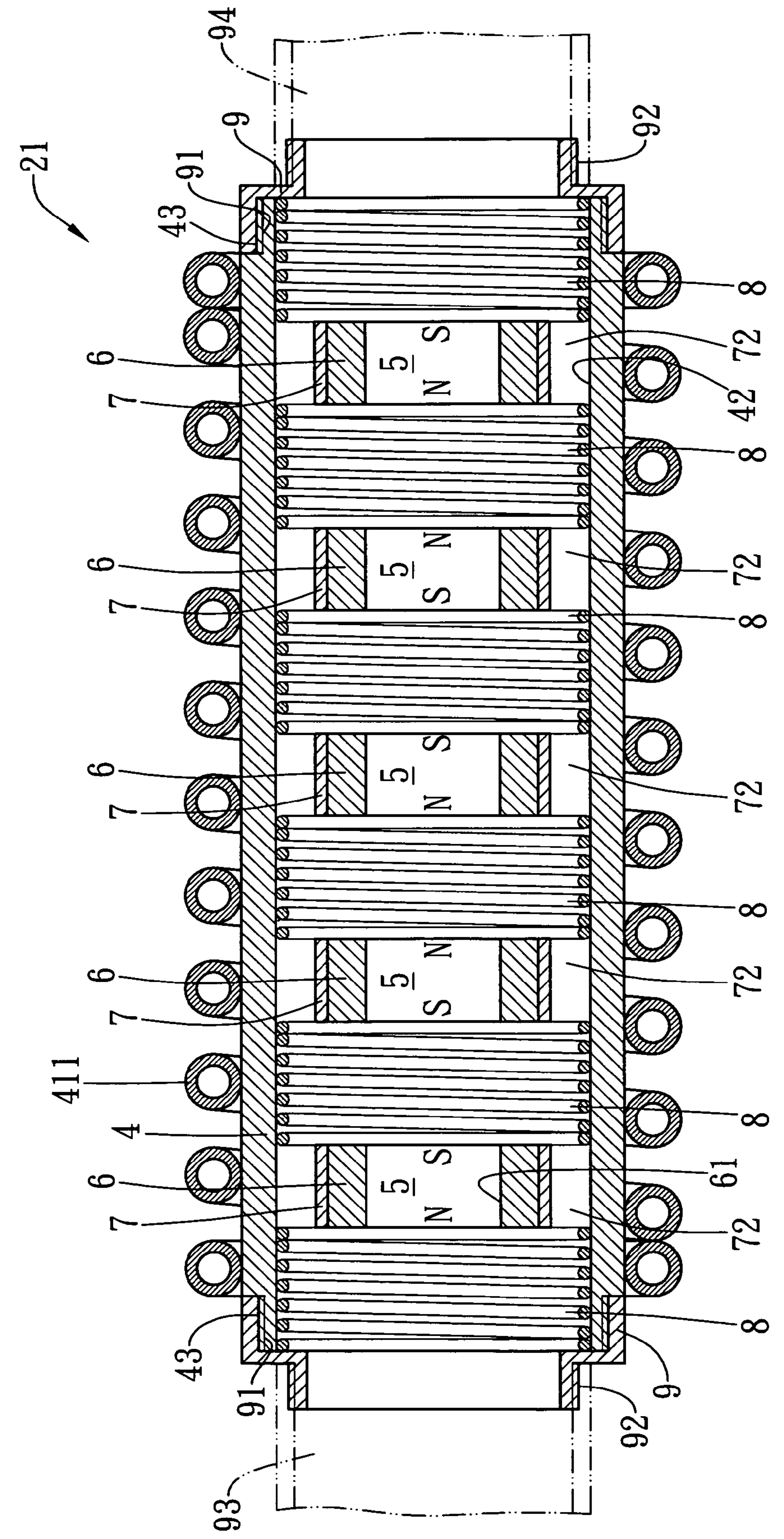
FIG. 4 shows a cross sectional view of the fuel economizer according to a second embodiment of the present invention.

Referring to FIG. 4, which shows a cross sectional view of the fuel economizer according to a second embodiment of the present invention, in which the thermal conducting elements of the fuel economizer 21 are coils 411 made of thermal conductive material. The coils 411 can be hollow or solid and functioned as having the surface areas thereof used for absorbing a large quantity of heat from the outside of the fuel economizer 21, and conducting the heat to the inner surface 42 of the pipeline 4 so as to preheat the fuel flowing through the spacings 72. As such, the temperature of the fuel can be increased beforehand to reach an ignition point for facilitating ignition and complete combustion, and thus reducing waste gas (carbon deposit) produced.

The fuel economizer of the present invention has advantages as follows. It does not require power supply and has a simple structure easy to clean and maintain and has an affordable price. The pipeline can provide preheating function for the fuel flowing through the chamber thereof so that the temperature of the fuel can be increased beforehand to reach an ignition point for facilitating ignition and complete combustion, and thus reducing waste gas produced. The magnetic elements can release magnetic energy to finely activate the fuel molecules and then to increase the combustion efficiency of the fuel so as to fulfill the purposes for fuel saving and horsepower increase. The magnetic elements also can absorb the impurities carried in the fuel so as to lengthen the lifetime of the engine.

Figure 5:
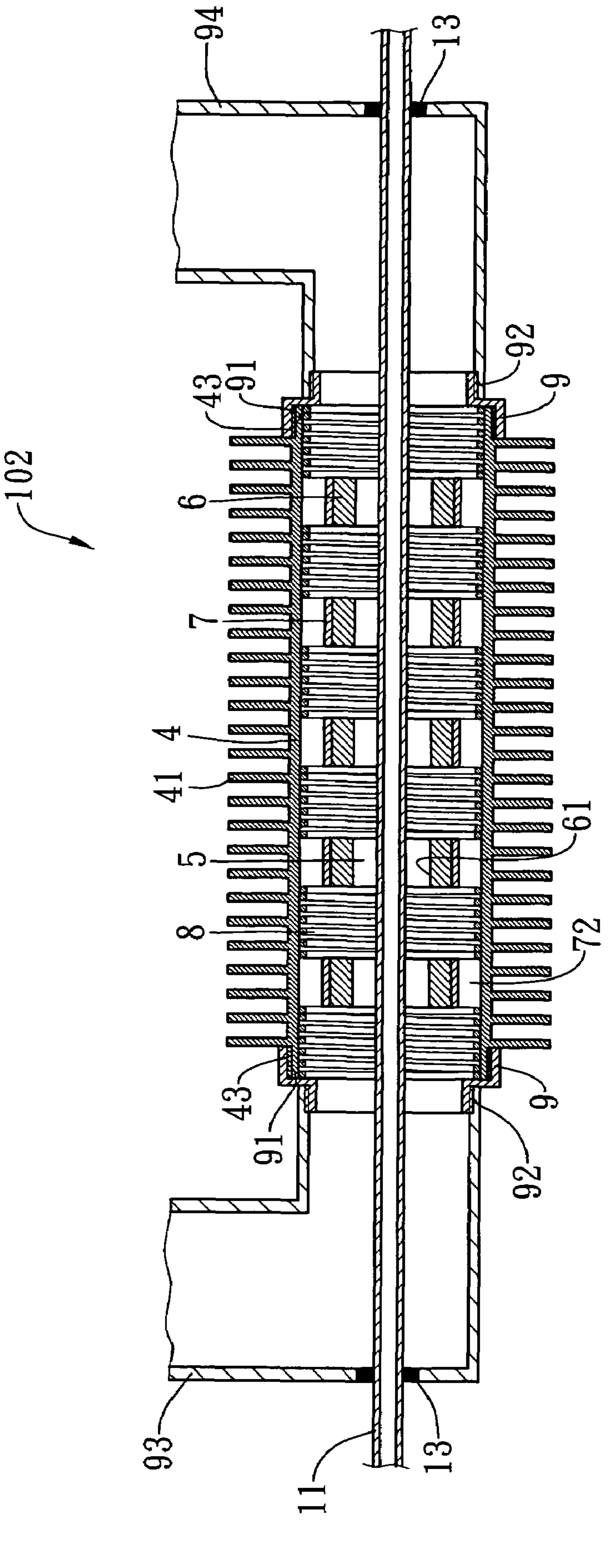
FIG. 5 shows a cross sectional view of the fuel economizer according to a third embodiment of the present invention.

Referring to FIG. 5, which shows a cross sectional view of the fuel economizer according to a third embodiment of the present invention. The fuel economizer 102 of the third embodiment is substantially the same with the second embodiment, while having difference in that the fuel economizer 102 of the third embodiment further comprises a conveyance pipe 11. The conveyance pipe 11 is disposed within the chamber 5 of the pipeline 4 and penetrates the plurality of magnetic elements 6 and the plurality of elastic elements 8, with the two ends thereof piercing through the fuel supply piping 93 and the engine piping 94, respectively, so as to convey the engine oil in the machine or the hot water in the engine to preheat the fuel flowing through the chamber 5 of the pipeline 4 and then to increase the combustion efficiency of the fuel for reaching the purposes of fuel saving and horsepower increase. Additionally, in the third embodiment, two washers 13 are each disposed where the conveyance pipe 11 pierces through the fuel supply piping 93 and the engine piping 94, respectively, for enhancing air tightness so that the leakage of the fuel flowing through the fuel supply piping 93 and the engine piping 94 is unlikely.

Figure 6:
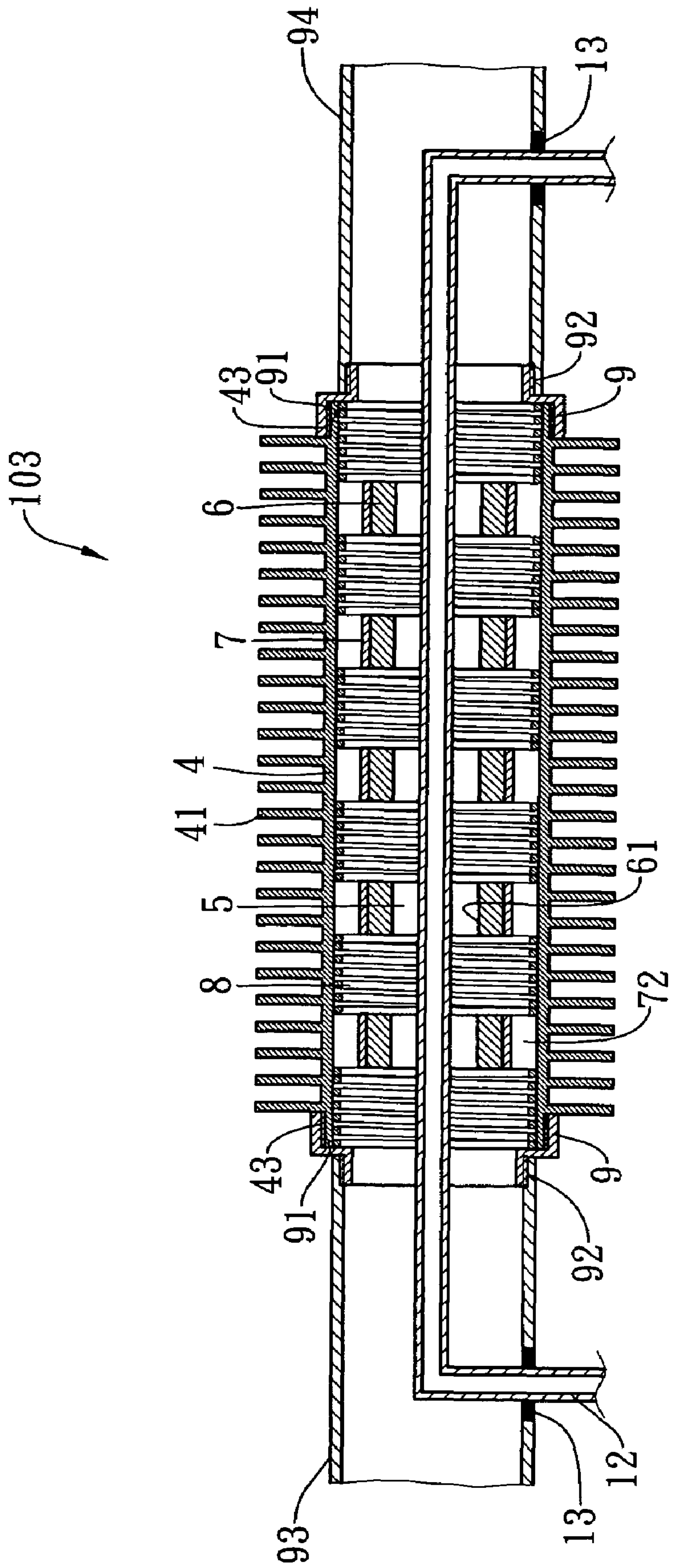
FIG. 6 shows a cross sectional view of the fuel economizer according to a fourth embodiment of the present invention.

Referring to FIG. 6, which shows a cross sectional view of the fuel economizer according to a fourth embodiment of the present invention. The fuel economizer 103 of the fourth embodiment is substantially the same with the second embodiment, while having difference in that the fuel economizer 103 of the fourth embodiment further comprises a conveyance pipe 12. The conveyance pipe 12 is disposed within the chamber 5 of the pipeline 4 and penetrates the plurality of magnetic elements 6 and the plurality of elastic elements 8, with the two ends thereof turning and piercing through the fuel supply piping 93 and the engine piping 94, respectively, so as to convey the engine oil in the machine or the hot water in the engine to preheat the fuel flowing through the chamber 5 of the pipeline 4 and then to increase the combustion efficiency of the fuel for achieving the purposes of fuel saving and horsepower increase. Additionally, in the fourth embodiment, two washers 13 are each disposed where the conveyance pipe 12 pierces through the fuel supply piping 93 and the engine piping 94, respectively, for enhancing air tightness so that the leakage of the fuel flowing through the fuel supply piping 93 and the engine piping 94 is unlikely.

As the preferred embodiments of the present invention have been described in detail, those skilled in the art may appreciate that a variety of changes and modifications may be made without departing from the scope and spirit of the appended claims. For example, the thermal conducting elements may be arbitrary elements made of materials with highly thermal conductivity, and the thermal conducting elements may be functioned as having the surface areas thereof used for absorbing a large quantity of heat from the outside of the fuel economizer of the present invention, and then conducting the heat to the inner surface of the pipeline, so as to preheat the fuel flowing through the spacings between the inner surface of the pipeline and the metal elements. Also, the present invention is not limited to the ways that these embodiments implement in the specification.

What is claimed is:

1. A fuel economizer, comprising:

a pipeline with thermal conducting elements and having a chamber contained therein;

a plurality of magnetic elements each having a through hole formed therein and wrapped within a metal element that is disposed in the chamber of said pipeline; and a plurality of elastic elements disposed within the chamber of said pipeline and located at two opposite sides of each of said magnetic elements;

wherein said elastic elements are springs.

2. The fuel economizer of claim 1, further comprising two engaging parts respectively disposed at two ends of said pipeline.

3. The fuel economizer of claim 2, wherein said engaging parts are provided with inner surface threads and outer surface threads.

4. The fuel economizer of claim 1, wherein said thermal conducting elements are fins.

5. The fuel economizer of claim 1, wherein said thermal conducting elements are coils.

6. The fuel economizer of claim 1, wherein said magnetic elements are disposed in a way that said neighboring magnetic elements have like polarities within the chamber of said pipeline polarities, and like poles are adjacent each other.

7. The fuel economizer of claim 1, wherein said metal element has a plurality of protrusions integrally formed with said metal element and outwardly extending from said metal element.

8. The fuel economizer of claim 1, wherein said metal element is made of copper, iron, aluminum, tin, zinc, nickel, gold, silver, lead, palladium or other composite metals.

9. A fuel economizer, comprising:

a pipeline with thermal conducting elements and having a chamber contained therein;

a plurality of magnetic elements each having a through hole formed therein and wrapped within a metal element that is disposed within the chamber of said pipeline;

a plurality of elastic elements disposed within the chamber of said pipeline and located at two opposite sides of said magnetic elements; and a conveyance pipe disposed within the chamber of said pipeline and penetrating said magnetic elements and said elastic elements;

wherein said elastic elements are springs.

10. The fuel economizer of claim 9, further comprising two engaging parts respectively disposed at two ends of said pipeline.

11. The fuel economizer of claim 10, wherein said engaging parts are provided with inner surface threads and outer surface threads.

12. The fuel economizer of claim 9, wherein said thermal conducting elements are fins.

13. The fuel economizer of claim 9, wherein said thermal conducting elements are coils.

14. The fuel economizer of claim 9, wherein said magnetic elements are disposed in a way that said neighboring magnetic elements have like polarities within the chamber of said pipeline polarities, and like poles are adjacent each other.

15. The fuel economizer of claim 9, wherein said metal element has a plurality of protrusions integrally formed with said metal element and outwardly extending from said metal element.

16. The fuel economizer of claim 9, wherein said metal element is made of copper, iron, aluminum, tin, zinc, nickel, gold, silver, lead, palladium or other composite metals.

17. The fuel economizer of claim 9, further comprising a fuel supply piping and an engine piping, wherein said conveyance pipe passes through said fuel supply piping and said engine piping.

18. The fuel economizer of claim 17, wherein two washers are respectively disposed where said conveyance pipe firstly passes through said fuel supply piping and said engine piping, for enhancing air tightness.

19. The fuel economizer of claim 9, wherein said pipeline with said thermal conducting elements is used for conveying gasoline and said conveyance pipe is used for conveying engine oil.

20. The fuel economizer of claim 9, wherein said pipeline with said thermal conducting elements is used for conveying gasoline and said conveyance pipe is used for conveying hot water of an engine.

* * * * *